United States Patent [19]

Yamazaki et al.

[11] Patent Number: 4,677,504
[45] Date of Patent: Jun. 30, 1987

[54] RECORDING APPARATUS FOR VIDEO SIGNAL

[75] Inventors: Minoru Yamazaki, Kanagawa; Teruhiko Kori, Tokyo, both of Japan

[73] Assignee: Sony Corporation, Tokyo, Japan

[21] Appl. No.: 832,673

[22] Filed: Feb. 25, 1986

[30] Foreign Application Priority Data

Feb. 25, 1985 [JP] Japan .................................. 60-35899

[51] Int. Cl.$^4$ .............................................. G11B 5/56
[52] U.S. Cl. ....................................................... 360/77
[58] Field of Search .......................................... 360/77

[56] References Cited

U.S. PATENT DOCUMENTS 4,597,023  6/1986  Rijckaert .............................. 360/77

FOREIGN PATENT DOCUMENTS 54-115113  7/1979  Japan .
58-36086   3/1983  Japan .................................... 360/77

*Primary Examiner*—George G. Stellar

[57] ABSTRACT

A recording apparatus for a video signal in which first and second heads for recording and reproducing are attached through electrostrictive elements to a rotary drum with an angular spacing of substantially 180° therebetween. When a video signal is recorded, a pilot signal recorded by the first head over a predetermined interval is reproduced by the second head while a pilot signal recorded by the second head and spaced apart by a predetermined number of recording tracks is reproduced by the first head. Reproduced levels of the pilot signals are compared so as to control a drive voltage for the electrostrictive elements and thus to adjust a step difference between the first and second heads in the recording mode.

6 Claims, 27 Drawing Figures

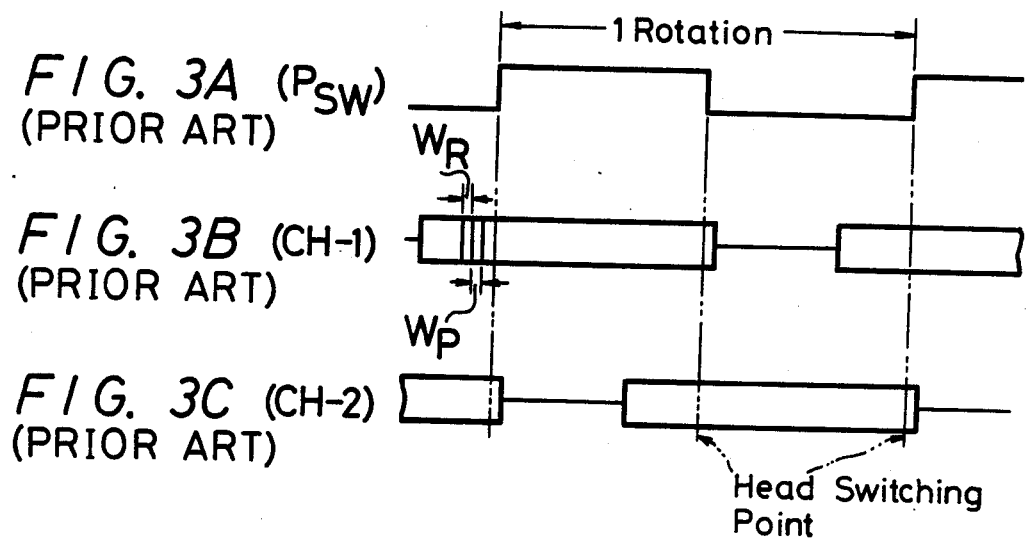
FIG. 3A (P_SW) (PRIOR ART)
FIG. 3B (CH-1) (PRIOR ART)
FIG. 3C (CH-2) (PRIOR ART)
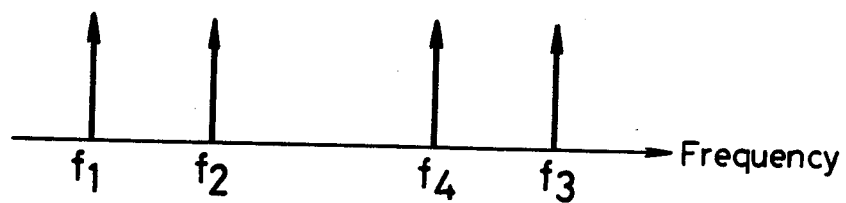
FIG. 4 (PRIOR ART)

RECORDING APPARATUS FOR VIDEO SIGNAL

BACKGROUND OF THE INVENTION

1. Field of the Invention

This invention relates to a recording apparatus for a video signal having a DTF (Dynamic Track Following) function to match a step difference between heads in the recording mode. A pilot signal recorded by one head is reproduced by another head which records the signal in the following track.

2. Description of the Prior Art

As a recording apparatus for a video signal, a recording apparatus for a video signal having a DTF function is already disclosed in published Japanese Patent Application No. 54-115113, in which a pair of heads, mounted on a rotary head assembly with an angular spacing of about 180° therebetween, are attached to electrostrictive elements, such as a bimorph leaf plate and so on. Thus, when recording a video signal, a step difference between the heads in the recording mode is matched while a pilot signal, recorded by one head, is being reproduced by the other head which records the signal in the next track.

FIG. 9 illustrates an example of a rotary head assembly of the prior art used in such a recording apparatus. This is a format used in unitary type video, such as a so-called 8 mm video tape recorder, and so on.

In drawing FIG. 9, reference numeral 1 designates a rotary drum on which a pair of recording/reproducing heads $H_1$ and $H_2$ which are different in azimuth angle, are mounted with an angular spacing of substantially 180° therebetween. These heads $H_1$ and $H_2$ are attached to electrostrictive elements 3 and 4, such as bimorph leaf plates. A magnetic tape 2 is wound around the rotary drum 1 over a predetermined angular range larger than 180°. A track corresponding to a tape wrapping angle exceeding 180° is used as an optional track (used for recording a PCM audio signal and the like).

FIG. 10 shows a prior art tape format thereof, in which $T_0$ represents an optional track and $T_V$ represents a video track. In order to match the step difference between the heads upon recording, prior to the recording of a video signal, a pilot signal $S_P$ used to match the step difference between the heads is recorded on every track over a predetermined interval $W_R$ (within 3 H) by using the heads $H_1$ and $H_2$. A part of an optional track is assigned to the predetermined interval $W_R$.

The pilot signal $S_P$ recorded by the head $H_1$, is reproduced by the head $H_2$ used to form the next track $T_V$, while the pilot signal $S_P$, recorded by the head $H_2$, is reproduced by the head $H_1$ used to form the next video track. Accordingly, as to each of the heads $H_1$ and $H_2$, the interval $W_R$ is the recording interval of the pilot signal $S_P$, while the succeeding interval $W_P$ is the reproducing interval of the pilot signal $S_P$.

Accordingly, if a drive voltage is applied to the electrostrictive elements 3 and 4 with the head $H_1$ or $H_2$ attached in such manner that the crosstalk component of the pilot signal $S_P$ reproduced by the head $H_2$, and the crosstalk component of the pilot signal $S_P$ reproduced by the head $H_1$ become equal, the step difference of the head $H_2$ relative to the head $H_1$ always becomes constant. Thus, a constant step difference is maintained between the heads during the recording mode at all times.

FIG. 11 illustrates a relationship among reproduced outputs (RF outputs) for first and second channels CH-1 and CH-2 derived from the heads $H_1$ and $H_2$, and a head switching pulse $P_{SW}$ when such a DFT control is carried out.

For the tracking in the playback mode, there is used a tracking servo which employs a pilot signal having 4 frequencies. In other words, when a video signal is recorded on the first video track $T_V$, a pilot signal of frequency $f_1$ is recorded thereon in a superimposed state, and in like manner, respective sine wave signals of frequencies $f_2$, $f_3$, and $f_4$ are recorded on the second to fourth video tracks $T_2$ to $T_4$ as the pilot signals inherent in the tracks. With these relationships, pilot signals corresponding to succeeding video tracks are recorded sequentially.

By way of example, frequency relations of a plurality of pilot signals are selected as follows (see FIG. 12):

$f_1 = 102$ kHz
$f_2 = 118$ kHz
$f_3 = 165$ kHz
$f_4 = 149$ kHz

When the pilot signal $S_p$ is recorded and reproduced by the recording apparatus having the DTF function, the playback interval $W_P$ in which the pilot signal $S_P$ can be reproduced does not include the entire recording interval $W_R$ of the pilot signal $S_P$, but it is determined by an interval $T_X$ in which the beginning of the track is displaced between the adjacent tracks regardless of the length of the recording interval $W_R$.

That is, as shown in FIG. 13, if a start point at which the pilot signal $S_P$ (hereinafter referred to as $S_{P1}$) is recorded by the first head $H_1$ which traces the track $T_1$, is taken as a, and an end point thereof is taken as d, the interval from a to d becomes the recording interval $W_R$. The length of this interval is determined as 3 H as a maximum. If the displacement between the beginnings of the tracks $T_1$ and $T_2$ is taken as $T_X$, the pilot signal $S_P$ (hereinafter referred to as $S_{P2}$) that is recorded by the second head $H_2$ which traces the track $T_2$ becomes the same as the pilot signal $S_{P1}$ in the recording start timing. Thus, the recording start point of the pilot signal $S_{P2}$ becomes a time point b which precedes the time point a by $T_X$, and a time point c which is distant therefrom by $W_R$ becomes the recording end point.

On the other hand, the second head $H_2$ which traces the second track $T_2$ is set in the playback mode from the recording end point c of the pilot signal $S_{P2}$. Thus, the crosstalk component of the pilot signal $S_{P1}$ recorded on the first track $T_1$ is reproduced thereby. Consequently, the playback start point of the pilot signal $S_{P1}$ becomes the point c, and the end point thereof becomes the point d, so that the interval from c to d becomes the playback interval $W_P$ of the pilot signal $S_{P1}$.

Since the interval bd in the first track $T_1$ becomes equal to $(W_R + T_X)$, and the interval bd in the second track $T_2$ is equal to $(W_R + W_P)$, the playback interval $W_P$ of the pilot signal $S_{p1}$ is equal to the track displacement $T_X$ between the adjacent tracks. Accordingly, when $W_R = 3$ H and $T_X = 1.5$ H, even if the recorded interval $W_R$ is 3 H, the interval $W_P$ in which the pilot signal $S_{p1}$ can be reproduced practically becomes 1.5 H. In such a case, even when the recording interval $W_R$ is selected to be 1.5 H, no troubles occur so that as shown in FIG. 14, $W_R - 1.5$ H ($\because W_P = 1.5$ H) is established.

Such a relationship is also established for a case in which the pilot signal $S_{p2}$ recorded on the second track $T_2$ is reproduced by the first head $H_1$ which traces the first track $T_1$ which is adjacent.

If the playback interval $W_P$ of the pilot signals $S_{p1}$ and $S_{p2}$ is presented as about 1.5 H, the crosstalk components thereof can be detected easily so that no troubles will occur in producing a voltage which drives the electrostrictive elements 3 and 4.

However, in the case of a recording apparatus such as an 8 mm video tape recorder or the like in which the track displacement $T_X$ is selected to be less than 1.5 H, such as 1.0 H or 0.5 H, in consideration of the head H alignment, there is the defect that as the displacement $T_X$ becomes small, the playback interval $W_P$ also becomes shorter. In this case, $T_X - 0.5$ H is for an LP (Long Play) mode, while $T_X - 1.0$ H is for an SP (Short Play) mode, respectively.

FIG. 15 shows an example of the recording and playback intervals $W_R$ and $W_P$ when $T_X - 0.5$ H is established. The playback interval $W_P$ of the pilot signals $S_{P1}$ and $S_{P2}$ becomes 0.5 H even when the recording interval $W_R$ is 3.0 H.

If the playback interval $W_P$ becomes short as described above, the playback information amount is extremely reduced so that the drive voltage for the electrostrictive elements 3 and 4 cannot be generated easily. When generating the voltage, a band pass amplifier having a good S/N ratio must be used, which causes the manufacturing cost to be increased.

SUMMARY OF THE INVENTION

It is an object of this invention to solve the prior art problems as mentioned above and provide a recording apparatus for a video signal which can produce a satisfactory amount of a reproduced pilot signal by increasing a substantial playback interval $W_P$, even when the track displacement $T_X$ is small.

According to the present invention, in order to solve the above mentioned problems, in the recording apparatus in which the first and second heads $H_1$ and $H_2$ for recording and reproducing are attached through the electrostrictive elements 3 and 4 to the rotary drum 1 with the angular spacing of substantially 180°, when recording the video signal, the pilot signal $S_{P1}$ recorded by the first head $H_1$ over a predetermined interval is reproduced by the second head $H_2$, while the pilot signal $S_{p2}$ recorded by the second head $H_2$, spaced apart by a predetermined number of recording tracks, is reproduced by the first head $H_1$.

In the invention, a recording mode adjusts a step difference between the heads so it is constant by a DTF operation. A pilot signal used to match the step difference between first and second heads is alternately recorded by using the pair of heads so that an interval which is the same as the recording interval of the pilot signal can be used as the signal playback interval. Even when a displacement between the beginnings of the adjacent tracks is as small as 0.5 H (h is the horizontal period), it is possible to secure a sufficient pilot signal reproducing interval.

BRIEF DESCRIPTION OF THE DRAWINGS

FIGS. 3A through 3C are diagrams showing a relationship between the switching operation of the head and a reproduced output;

FIG. 4 is a diagram showing a relationship of frequencies of the pilot signals used in the tracking servo during the playback mode;

FIG. 11 is a frequency characteristic graph of a video signal and the like;

DESCRIPTION OF THE PREFERRED EMBODIMENTS

Figure 1:
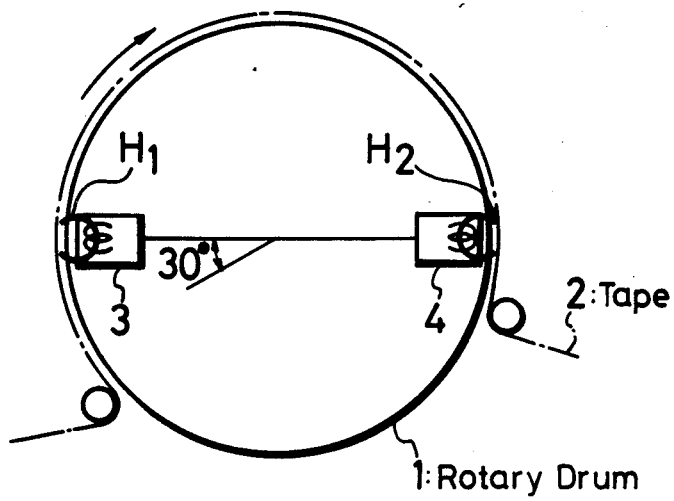
FIG. 1 is a diagram useful for explaining a rotary head assembly.
Figure 2:
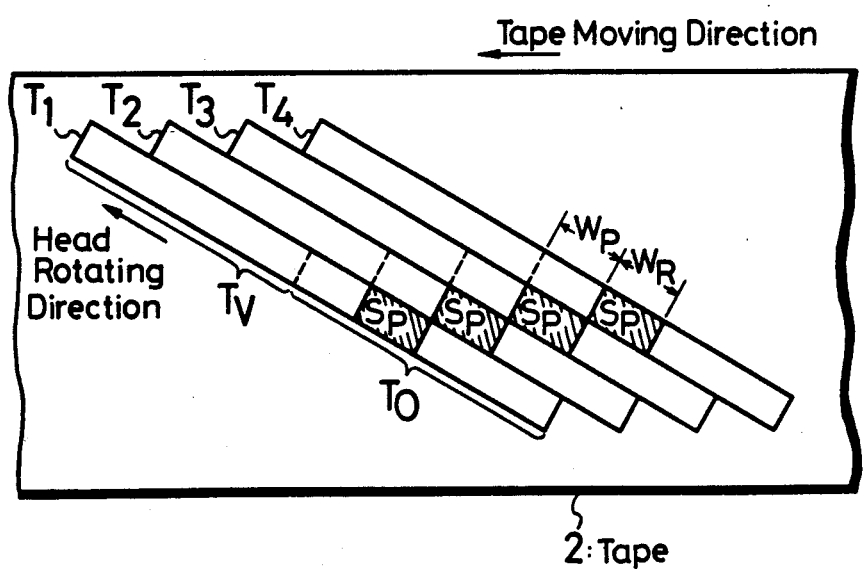
FIG. 2 is a diagram showing a tape format thereof.
Figure 5:
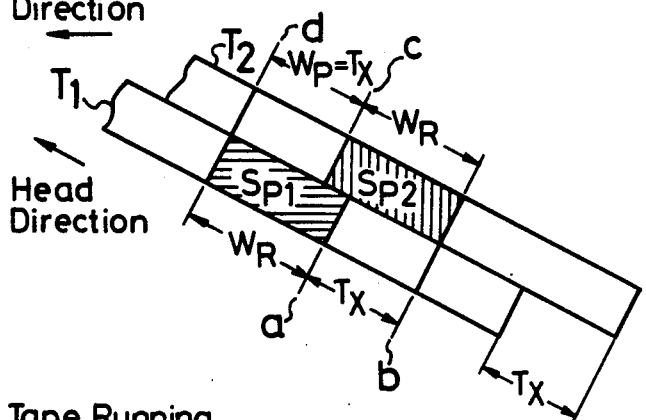
FIGS. 5 to 7 are diagrams showing the recording modes of the pilot signals for the recording tracks.
Figure 6:
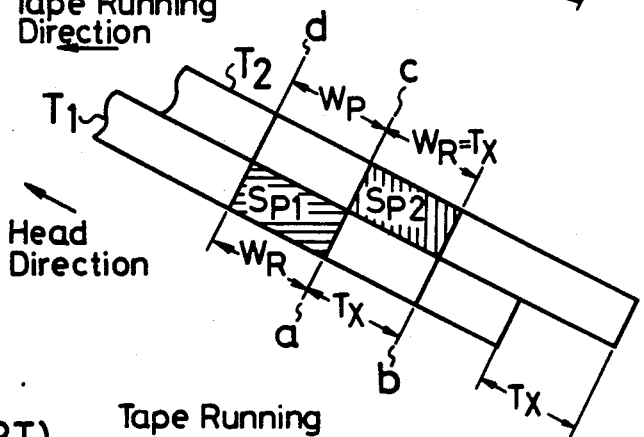
Figure 7:
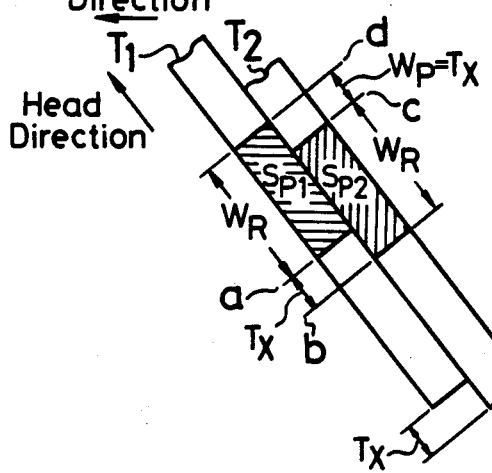
Figure 8:
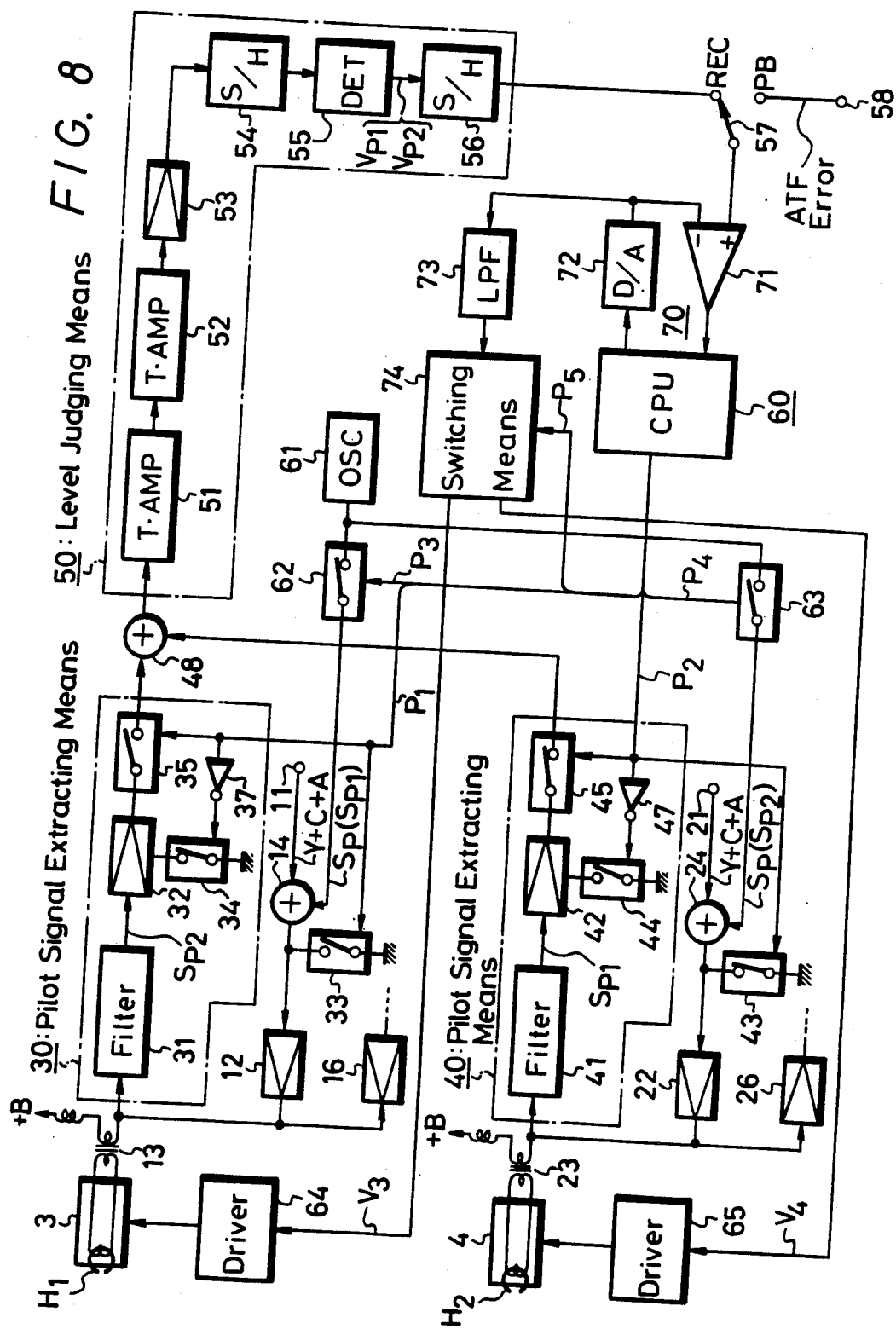
FIG. 8 is a system block diagram showing an embodiment of a recording apparatus for a video signal according to the present invention.

In FIGS. 1 and 8, reference numeral 1 represents the rotary drum, 2 the magnetic tape, $H_1$ and $H_2$ the first and second heads, 3 and 4 the electrostrictive elements, 12 and 22 the recording amplifiers, 30 and 40 the pilot signal extracting means, 31 and 41 the LC filters, 23 and 43 the control means, 50 the level judging means, 60 the CPU, $S_{P1}$ and $S_{P2}$ the pilot signals used to adjust the step difference between the heads, 34, 35, 44, 45, 62 and 63 the switching means, 70 the succeeding comparison-type A/D converter, and $V_{P1}$ and $V_{P2}$ the envelope detected outputs of the reproduced pilot signals.

Figure 10:
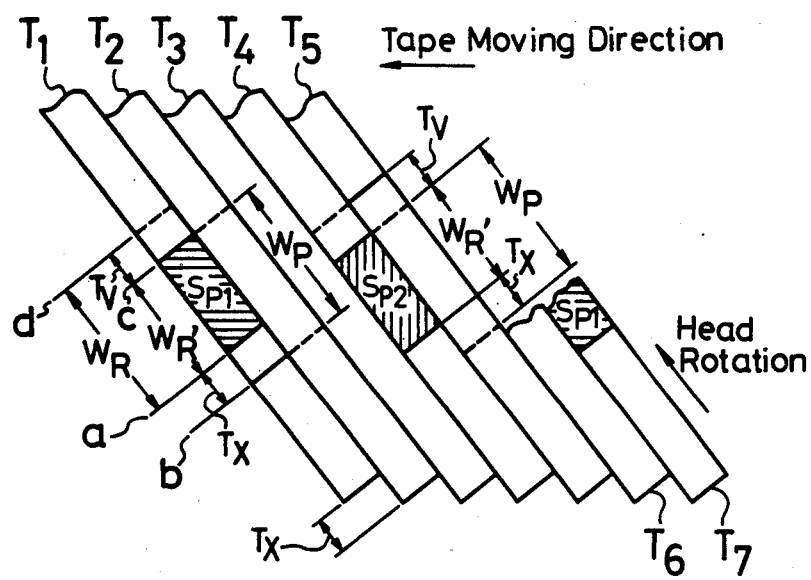
FIG. 10 is a diagram showing a relationship between a recorded pattern and a recorded position of a pilot signal.

Reference will now be made to FIG. 10 for explaining the invention. When the first track $T_1$ is traced by the first head $H_1$, the pilot signal $S_{P1}$ is recorded over a predetermined interval. When the second track $T_2$ adjacent to the first track $T_1$ is traced by the head $H_2$, the crosstalk component of the pilot signal $S_{P1}$ is reproduced. Also at this time, the pilot signal $S_{P2}$ is not recorded on the second track $T_2$.

When the second head $H_2$ is positioned on the fourth track $T_4$ traced by the second head $H_2$, a pilot signal $S_{P2}$ is recorded by the second head $H_2$ over the predetermined interval, while when a fifth track $T_5$, adjacent to the fourth track $T_4$, is traced by the first head $H_1$, the crosstalk component of this pilot signal $S_{P2}$ is reproduced. Also, at that time the pilot signal $S_{P1}$ is not recorded by the first head $H_1$.

If the pilot signal $S_{P2}$ is not recorded on the second track $T_2$, during a period in which the second head $H_2$ traces the portion corresponding to the recording interval $W_R$ of the pilot signal $S_{P1}$ recorded by the first head $H_1$, this second head $H_2$ can be placed in the playback mode. Accordingly, the playback interval $W_p$ becomes equal to the recording interval $W_R$. This is also the same for the case in which the pilot signal $S_{P2}$ is recorded by the second head $H_2$.

Regardless of the length of the track displacement $T_X$, the playback interval $W_P$ can be made equal to the recording interval $W_R$ so that even when the track displacement $T_X$ is small, it is possible to obtain a sufficient amount of the reproduced pilot signal.

These pilot signals $S_{P1}$ and $S_{P2}$ are compared with each other in playback level and on the basis of the compared output, and the drive voltage for the electrostrictive elements 3 and 4 is controlled. The step difference between the first and second heads $H_1$ and $H_2$ is adjusted during the recording mode.

An embodiment of a recording apparatus for a video signal according to this invention will hereinafter be described in detail with reference to FIG. 8 and the following. For convenience of explanation, a relationship between the recorded track pattern and the pilot signals $S_{P1}$ and $S_{P2}$ formed by the recording apparatus will be described in the first place.

The relationship between the recorded track pattern and the pilot signals will now be described.

In FIG. 10, odd tracks $T_1$, $T_3$, $T_5$, ... designate recorded tracks formed by the first head $H_1$, while even tracks $T_2$, $T_4$, ... designate recorded tracks formed by the second head $H_2$. The first head $H_1$, which traces the first track $T_1$, starts to record the pilot signal $S_{P1}$ from the time point a and stops the recording at the time point c. If this interval is taken as $W_R'$, $$W_R = W_R' + T_Y$$

where the interval $T_Y$ is selected to be equal to the track displacement $T_X$. Accordingly, if $W_R = 3.0$ H and $T_X = 0.5$ H are established, the interval $W_R'$ in which the pilot signal $S_{P1}$ is recorded practically becomes 2.5 H.

The second head $H_2$ for tracing the second track $T_2$ is controlled so as to be placed in the playback mode from the time point b which is a timing which is the same as the recording start time point a of the pilot signal $S_{P1}$. The playback mode is continued until the time point c. Accordingly, if the interval between b and c is taken as the playback interval $W_P$, $$W_P = W_R' + T_X = W_R$$

Since no pilot signal $S_{P1}$ exists in the interval $T_X$, the substantial playback interval becomes equal to the interval $W_R'$, for example, 2.5 H in this embodiment.

When the recording start timing and the reproducing start timing are selected to be the same, the maximum playback interval $W_P$ becomes the recording interval $W_R$. At that time, since the recording start point and the playback start point on the tape are displaced by $T_X$, the end point of the playback interval $W_P$ is displaced from the end point d of the recording interval $W_R$ by $T_X$. Accordingly, if the interval in which the pilot signal $S_{P1}$ is, in practice, recorded and is selected to be longer than $W_R'$, this becomes useless. Therefore, the practical signal recording interval $W_R$, is selected as $$W_R' = W_R - T_Y = W_R - T_X$$

No pilot signal $S_P$ is recorded on the third track $T_3$, similar to the second track $T_2$. However, on the fourth track $T_4$ that will be again traced by the second head $H_2$, there is recorded the pilot signal $S_{P2}$ at the same timing and over the same period as mentioned above, and the crosstalk component of the pilot signal $S_{P2}$ is reproduced over the interval $W_P$ by the first head $H_1$ which traces the fifth track $T_5$ adjacent to the fourth track.

The fact that when the pilot signal $S_{P1}$ is recorded by the first head $H_1$, the next pilot signal $S_{P2}$ is recorded by the second head $H_2$, is based on the following reason. The displacement of the second head $H_2$ relative to the first head $H_1$ is detected by reproducing the pilot signal $S_{P1}$ by the second head $H_2$. The displacement of the first head $H_1$ relative to the second head $H_2$, that is the displacement of the second head $H_2$ relative to the first head $H_1$ when the first head $H_1$ is taken as the reference, is detected by reproducing the pilot signal $S_{P2}$ by the first head $H_1$. Therefore, if the height of the second head $H_2$ is controlled so as to make the reproduced levels of the pilot signals $S_{P1}$ and $S_{P2}$ equal, it is possible to keep the step difference between both the heads $H_1$ and $H_2$ constant.

On the contrary, when the pilot signals $S_{P1}$ and $S_{P2}$ are recorded by only the first head $H_1$ in any case, if the reproduced levels of both the pilot signals $S_{P1}$ and $S_{P2}$ are compared, it is not possible to obtain information as to the amount and direction in which the height of the second head $H_2$ should be controlled.

Consequently, according to the present invention, it is possible to obtain information as to matching the step difference between the heads at every 6 tracks (6 fields when an information of one field is recorded on one track). In the prior art, the information is completed at every two tracks (2 fields). When the information is detected at every 6 fields, it takes a time three times as long as the time required when the information is detected at every 2 fields. In this case, however, since the distortion is previously erased so as to remove the hysteresis characteristics of the electrostrictive elements 3 and 4, the displacement amount of the step difference between the heads is not so large originally (ordinarily, from several $\mu$m to about 10 $\mu$m). Therefore, although the detection time takes nearly 6 fields, the response property of the control can be prevented from being deteriorated considerably.

An explanation will now be provided for the recording and reproducing of the pilot signal.

FIG. 8 is a systematic block diagram showing an embodiment of a recording apparatus for a video signal by which the above mentioned recording and reproducing state of the pilot signal can be realized.

Figure 11:
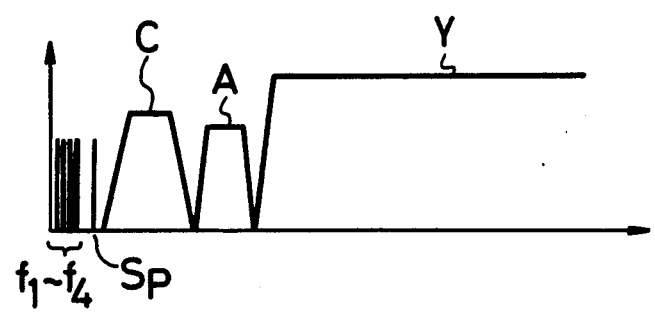

To a terminal 11, there is supplied a signal, such as a video signal or the like to be recorded on the video track $T_Y$. As shown in FIG. 11, the video signal includes an FM luminance signal Y and a low frequency band-converted chrominance signal C. In addition to this video signal, an FM audio signal A, the frequency region of which is selected between the frequency bands of these signals Y and C, is provided. Also, the above-mentioned pilot signals used for tracking servo in the playback mode are provided, and which are frequency-multiplexed. The frequency-multiplexed and mixed signal is supplied to the terminal 11. The mixed signal is supplied through a recording amplifier 12 and a rotary transformer 13 to the first head $H_1$.

On the other hand, reference numeral 61 designates an oscillator which generates a continuous wave signal for the pilot signal $S_P$. This continuous wave signal is allowed by switching means 62 to pass therethrough only during the predetermined recording interval $W_R'$ shown in FIG. 9B, and converts to the pilot signal $S_{P1}$ of a burst shape and is then fed to an adder 14. The signal therefrom is recorded by the first head $H_1$. For this purpose, to the switching means 62 there is supplied a switching pulse (third switching pulse) P3 shown in FIG. 9D. This signal $S_{P1}$ is bias-recorded by using the FM luminance signal Y as the carrier.

The mixed signal reproduced by the first head $H_1$ is supplied through a preamplifier 16 to a signal reproducing system (not shown).

The recording system for the second channel is formed in the same way. That is, a mixed signal applied to a terminal 21 is supplied through a recording amplifier 22 and a rotary transformer 23 to the second head $H_2$, and a pilot signal $S_{P2}$ (FIG. 9C) which is formed as a burst signal by a switching means 63, is fed to an adder 24. Accordingly, only during the interval $W_R'$ is pilot signal $S_{P2}$ recorded on the tape 2 by using the FM luminance signal Y as the carrier. To the switching means 63 there is supplied a fourth switching pulse $P_4$ shown in FIG. 9H. The mixed signal reproduced by the second head $H_2$ is supplied through a preamplifier 26 to the reproducing system.

The pilot signal $S_P$ is selected to be a single low frequency signal having a small azimuth loss in order that it can be reproduced as the crosstalk component from the adjacent track. Also, the frequency thereof is selected such that it can be frequency-separated from the mixed signal during reproducing. The standard value thereof is less than 230 kHz, and in this embodiment, a sine wave signal having a frequency of 230 kHz is used as the pilot signal.

Control means 33 and 43, which are respectively formed of switching means, are provided in the stages prior to the recording amplifiers 12 and 22 to inhibit the recording current from being supplied to the recording amplifiers 12 and 22 only during the period in which the first and second heads $H_1$ and $H_2$ are used as the playback heads, that is during the interval $W_P$.

Figure 9:
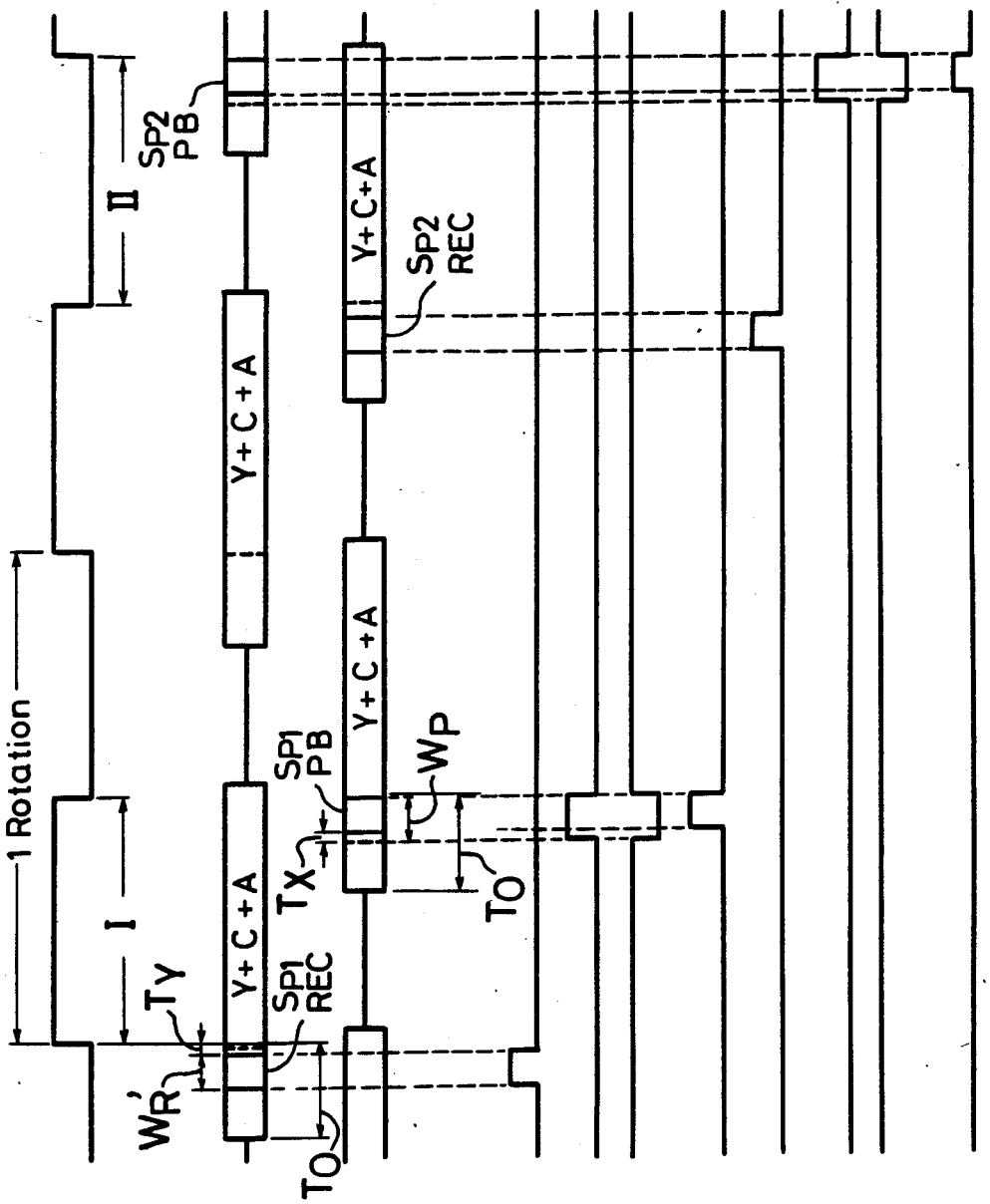
FIG. 9A through 9K are waveform diagrams useful for explaining the operation of the system of FIG. 8.

If, as shown in FIG. 9, the pilot signal $S_{P1}$ is recorded by the first head $H_1$ and the pilot signal $S_{P2}$ is recorded by the second head $H_2$, the pilot signal $S_{P1}$ in the reproduced outputs from the second head $H_2$ during a period I in FIG. 9 is fed to a pilot signal extracting means 40. This extracting means 40 includes an LC filter 41 (the cut-off frequency thereof lies in a range from 300 to 400 kHz) used to extract and to separate only the pilot signal $S_{P1}$. The pilot signal $S_{P1}$ extracted and separated thereby is amplified by a playback amplifier 42 and is supplied to a switching means 45. The pilot signal $S_{P1}$ is transmitted to the succeeding stages only during the playback interval $W_P$ of the period I. The playback amplifier 42 is associated with switching means 44 and the amplifier 42 is controlled such that when the switching means 44 is turned off, the reproduced output is obtained, while when the switching means 44 is turned on, the reproduced gain of the amplifier 42 becomes zero.

These switching means 44 and 45 and the above mentioned control means 43 are simultaneously controlled by a common second switching pulse $\overline{P_2}$ (FIG. 9E). In this case, in order that the recording current is inhibited from flowing during the playback interval $W_P$, while the pilot signal $S_{P1}$ extracted by the filter 41 is delivered, a second switching pulse $P_2$ (FIG. 9F) is supplied from an inverter 47 to another switching means 44, so that when the control means 43 and the switching means 45, which are controlled commonly by a second switching pulse $P_2$, are respectively turned on, the other switching means 44 is turned off.

In like manner, also the first channel is provided with the control means 33 and a pilot signal extracting means 30. This extracting means 30 includes an LC type filter 31. A pilot signal $S_{P2}$ (period II in FIG. 9) extracted and separated thereby is amplified by a playback amplifier 32 and fed to a switching means 35. Thus, the pilot signal $S_{P2}$ is transmitted to the following stage only during the playback interval $W_P$ relating to the first head $H_1$ similarly as mentioned above. The playback amplifier 32 is associated with a switching means 34 so that when the switching means 34 is turned off, the reproduced output is obtained therefrom.

Accordingly, in order that during the playback interval $W_P$ of the first head $H_1$, the recording current is inhibited from flowing, while the pilot signal $S_{P2}$ extracted by the filter 31 is delivered, a first switching pulse $\overline{P_1}$ is supplied from an inverter 37 to another switching means 34, so that when the control means 33 and the switching means 35, which are commonly controlled by the first switching pulse $P_1$ (FIG. 9I), are respectively turned on, another switching means 34 is turned off. However, FIG. 8 shows the switched state of the switch only in the case of period I.

The pilot signals $S_{P1}$ and $S_{P2}$, which are respectively derived from the pilot signal extracting means 30 and 40 at different time points, are supplied through an adder 48 to level judging means 50.

The level judging means 50 includes a pair of tuning amplifiers 51 and 52 that are connected in cascade, and by which undesired signals and external noises contained in the outputs from the extracting means 30 and 40 are removed and only the pilot signals $S_{P1}$ and $S_{P2}$ are extracted therefrom. These pilot signals are supplied through an amplifier 53 to a first sample and hold circuit 54 in which RF amplitudes of the pilot signals $S_{P1}$ and $S_{P2}$ obtained during the playback interval $W_P$ are sampled and then held. The amplitudes are fed to a diode detector 55 and an envelope is detected thereby. Envelope detected outputs $V_{P1}$ and $V_{P2}$ (FIGS. 9G and 9K) are again sampled and held by a second sample and hold circuit 56 during the playback interval $W_P$ and then fed to, in this example, a microcomputer 60, executing the calculation processing for matching the step difference between the heads.

That is, the detected output $V_{P1}$, which is the crosstalk component of the pilot signal $S_{P1}$ reproduced by the second head $H_2$, and the detected output $V_{P2}$, which is the crosstalk component of the pilot signal $S_{P2}$ reproduced by the first head $H_1$, are calculated so as to generate drive voltages $V_3$ and $V_4$ which reduce the difference therebetween to zero. When these drive voltages are supplied through drivers 64 and 65 to the electrostrictive elements 3 and 4, the step difference in level of the second head $H_2$ relative to, for example, the first head $H_1$ which is taken as a reference, for example, is controlled so as to always make the step difference between the heads constant.

A switch 57, provided in the succeeding stage of the level judging means 50, is a switch that is switched during the recording and reproducing mode of the mixed signal. Upon reproducing, a tracking error signal (ATF error signal) formed by the pilot signals with the frequencies of $f_1$ to $f_4$ is supplied to a terminal 58, and on the basis of this tracking error signal, the drive voltages $V_3$ and $V_4$ applied to the electrostrictive elements 3 and 4 are controlled.

The above mentioned first to fourth switching pulses $P_1$ to $P_4$ are generated from the microcomputer 60 on the basis of a head switching pulse $P_{SW}$ (FIG. 9A).

The detected outputs $V_{P1}$ and $V_{P2}$ obtained from the level judging means 50 shown in FIG. 8 are converted to digital signals (for example, digital signals of 8 bits) by a successive comparison type A/D converter 70 utilizing the microcomputer 60. As is well known, the A/D converter 70 is formed of a differential amplifier 71, the CPU 60, and a D/A converter 72, in which a D/A output and the detected outputs $V_{P1}$ and $V_{P2}$ are sequentially compared with one another bit by bit. The A/D converted outputs equal to the detected outputs $V_{P1}$ and $V_{P2}$ are calculated by the CPU 60, generating electrostrictive element drive voltages (digital signals) which control the step difference between the heads. These drive voltages are D/A-converted and then smoothed by a low pass filter 73. The drive voltages $V_3$ and $V_4$ are smoothed and supplied to the driver 64 or 65 by a switching means 74, if necessary. Hence, the electrostrictive element 3 or 4 is biased by a predetermined amount in a predetermined direction by the drive voltage $V_3$ or $V_4$.

An explanation will now be provided for the adjustment of the step difference between the heads.

Figure 12:
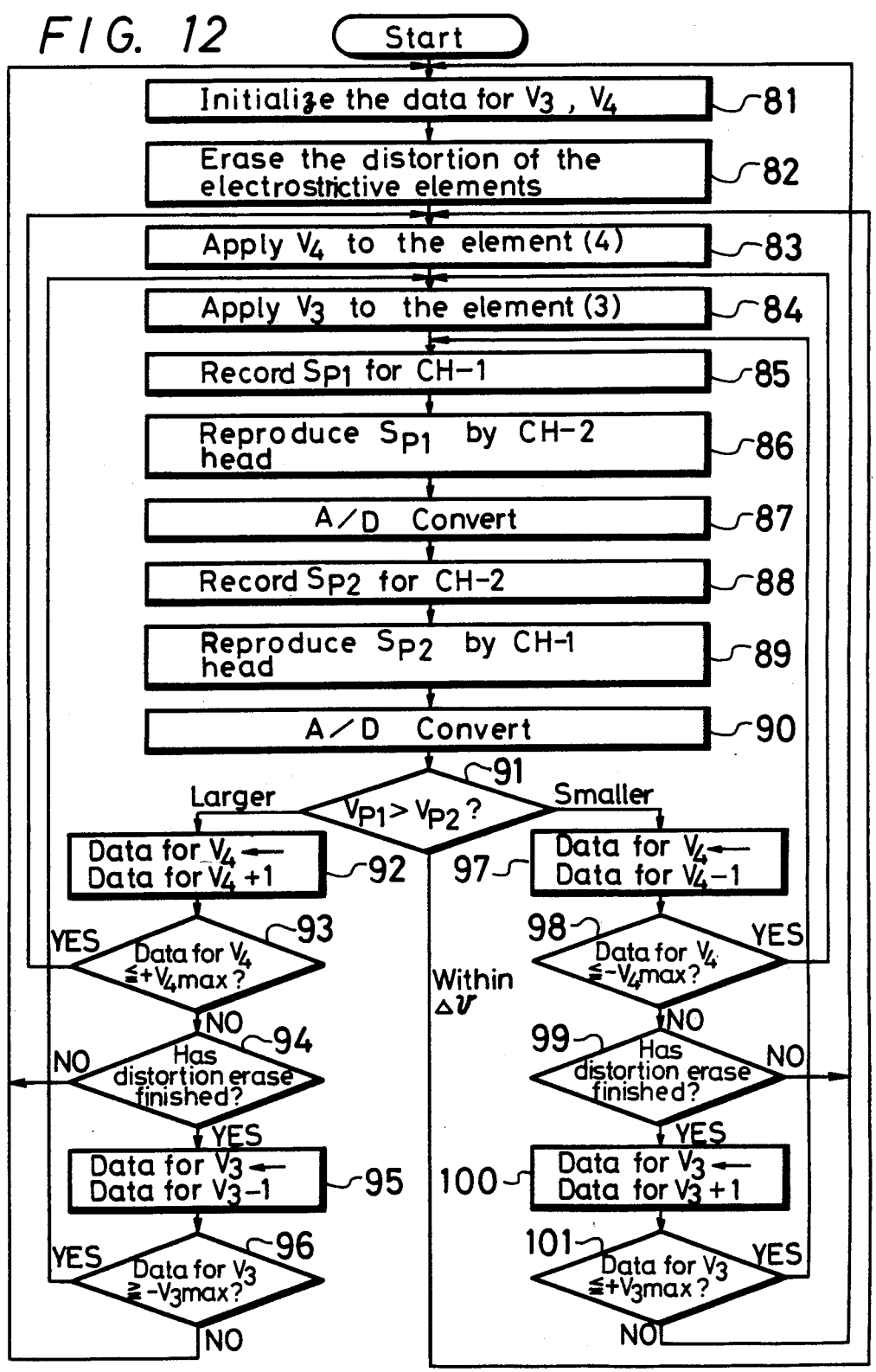
FIG. 12 is a flow chart of the recording and playback modes of the pilot signal.

FIG. 12 is a flow chart showing an example of a case in which the step difference between the heads is controlled by using the above mentioned CPU 60.

Figure 13:
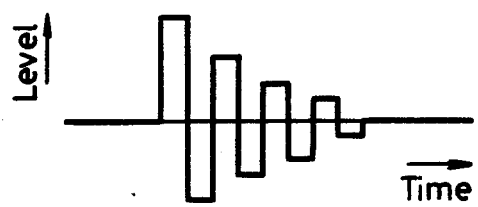
FIG. 13 is a waveform diagram of an example of a distortion erase signal.

Referring to FIG. 12, when the program for controlling the step difference between the heads is started at step 81, the initialization of data for controlling the electrostrictive elements 3 and 4 is executed, and at step 82, the distortions of the respective electrostrictive elements 3 and 4 are erased. As the signal for erasing the distortion, there can be used an attenuating signal, the signal level of which is attenuated in accordance with time as shown, for example, in FIG. 13.

As is well known, since the electrostrictive elements have the hysteresis characteristics, the distortion erasing operation is carried out so as to reduce the hysteresis characteristic to be zero.

Figure 14:
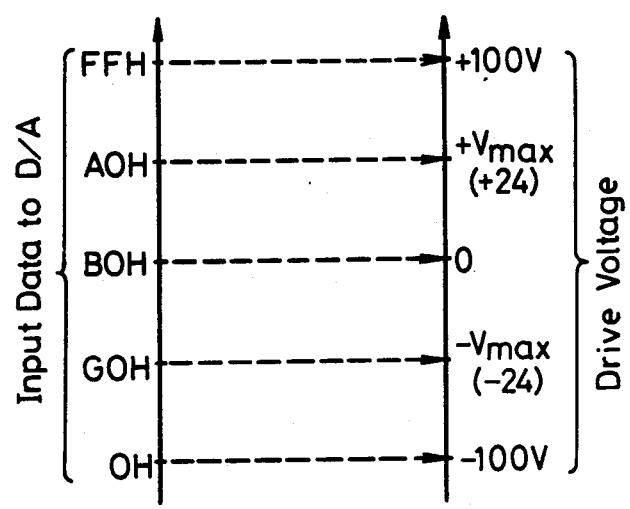
FIG. 14 is a diagram showing a relationship between digital data and an electrostrictive element drive voltage.

After the distortion is erased, the program goes to step 83, in which the initial drive voltage $V_4$ (=0) is applied to the electrostrictive element 4. In like manner, at step 84 the initial drive voltage $V_4$(=0) is applied to the electrostrictive element 3. As shown in FIG. 14, the initial drive voltages and the digital data (output data from the A/D converter 70 and, for example, 8 bit data) for the drive voltage generated by the CPU 60 are related to each other such that when the data is an intermediate digital data 80 H (H is the hexadecimal notation), the drive voltage V becomes zero.

After the above mentioned initial operation was carried out, at step 85 the pilot signal $S_{P1}$ is recorded on the first channel, and after this, pilot signal $S_{P1}$ was reproduced by the second head $H_2$ (at step 86). This pilot signal is A/D-converted by the A/D converter 70 (at step 87). Similarly, when the fourth track $T_4$ is traced by the second head $H_2$, the pilot signal $S_{P2}$ is recorded (at step 88). At step 89, this signal is also reproduced by the first head $H_1$, and at step 90, it is A/D-converted similarly as described above.

Figure 15:
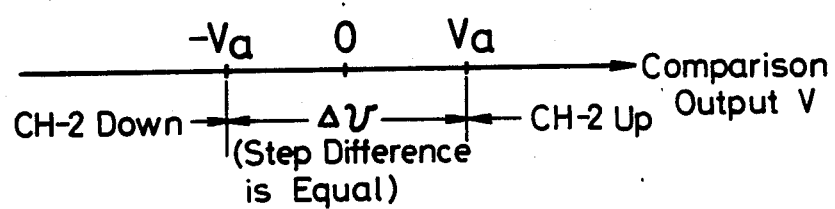
FIG. 15 is a diagram useful for explaining an example of a head control.

The A/D-converted outputs corresponding to the detected outputs, which are the crosstalk components of the pilot signals $S_{P1}$ and $S_{P2}$, are compared in level at step 91, and the control operation corresponding to the magnitude of the compared output is executed. In this case, when the compared output V is larger than a predetermined level Va as shown in FIG. 15, the drive voltage $V_4$ is applied to the electrostrictive element 4 so that the electrostrictive element is controlled such that the position of the second head $H_2$ for forming the second channel relative to the rotary drum 1, in this embodiment, may become high. When the compared output V is lower than a predetermined level $-Va$, the electrostrictive element is controlled such that the height of the position of the second head may become low. When the compared output V lies in a range from these predetermined levels $-Va$ to Va ($=\Delta V$), the control operation for the electrostrictive element 4 is not carried out.

The reason why such a dead zone or insensitive band is provided will be described below. Under the state of the substantially normal step difference between the heads, when the level of the detected outputs $V_{P1}$ and $V_{P2}$ is very slightly fluctuated due to the mixture of an external noise and the change of temperature, if the control operation is inhibited, the control operation becomes more stable. At the same time, when the compared output V falls within the $\Delta V$, even if the step difference between the heads is treated as a normal one, no troubles will occur.

When at step 91 the compared output exceeds the level $\Delta V$ of the dead zone and is higher than the predetermined level Va, the program goes to step 92 in which the data (A/D-converted output data) of the drive voltage $V_4$ is incremented by +1 (one bit data). When the incremented data is smaller than the maximum drive voltage V max ($=V_4$ max) thereof (see FIG. 14), the program goes to step 93 in which the drive voltage $V_4$ based on the incremented data is applied to the electrostrictive elements 4. Thus, the height of the second head $H_2$ is adjusted to become higher than the former height. The amount of the head $H_2$ to be moved by this one step is selected to be less than 1 $\mu$m, for example, about 0.5 $\mu$m.

This control operation is sequentially executed, and when the compared output enters the dead zone, the program goes to step 85 in which the adjustment operation for adjusting the step difference between the heads is ended.

The above mentioned maximum drive voltage $V_4$ max is a maximum drive voltage (DC voltage) such that even when it is applied to the electrostrictive element 4, no mechanical change results. As shown in FIG. 14, for example, when the electrostrictive element is one which can be applied with a DC voltage of ±100 V as the drive voltage, the maximum drive voltage is about ±24 V (when the 8-bit data is expressed by the hexadecimal representation, digital data of 60 H to A0 H).

The reason why the step difference between the heads is not adjusted by only one correction operation, but is sequentially corrected in several steps, in step-by-step fashion, is to avoid a mis-operation due to the noises contained in the reproduced pilot signals $S_{P1}$ and $S_{P2}$.

On the other hand, when the data is incremented with the result that even the data for the drive voltage $V_4$ becomes larger than the maximum drive voltage $V_4$ max, it can not enter the dead zone, and the program goes to step 94 in which it is determined whether the distortion erase operation is carried out or not. In other words, when the drive voltage data exceeds the maximum drive voltage $V_4$ max before the compared output enters into the dead zone, it can be considered that without erasing the distortion of the electrostrictive element 4, the adjustment for removing the step difference between the heads was executed.

When the distortion erasing operation is not carried out, the program returns to step 81. When, on the other hand the distortion is already erased, the program goes to step 95, in which, contrary to the above, under the state that the drive voltage $V_4$ for the electrostrictive element 4 is kept as it is, the data of the drive voltage $V_3$ for the electrostrictive element 3 is incremented by $-1$ (one bit data). When this data is judged as less than the data of the maximum drive voltage $-V$ max (referred to be $-V_3$ max) (see FIG. 14) at step 96, the program goes to step 84 in which on the basis of the newly incremented data, the drive voltage is applied to the electrostrictive element 3 so as to adjust the first head $H_1$ such that its height becomes lower. As a result, when the compared output V enters the dead zone, the height adjustment work is ended.

However, when the compared output does not enter the dead zone even after the data was incremented, the data becomes equal to the maximum drive voltage $-V_3$ max data. At that time, the program returns to the step 81, in which the adjusting work is again executed.

When, on the other hand, the compared output V is less than the predetermined level $-V_a$, contrary to the above, the data is incremented by $-1$ at step 97. When the resultant data is less than the data of the maximum drive voltage $-V_4$ max (at step 98), the program returns to step 83 in which the electrostrictive element 4 is controlled by the drive voltage $V_4$ based on the data that was incremented at step 83. As a result of incrementing the data, when the data for the drive voltage $V_4$ becomes larger than the maximum drive voltage $-V_4$ max, the program goes to step 99 in which it is determined if the distortion erasing operation is executed or not. In other words, when the drive voltage exceeds the maximum drive voltage before the compared output does not enter into the dead zone, it can be considered that without erasing the distortion of the electrostrictive element 4, the adjustment for adjusting the step difference between the heads was executed similarly as mentioned above.

When the distortion erasing operation is not carried out, the program returns to step 81, while when the distortion erasing operation was already executed, the program goes to step 100, in which case similarly as mentioned above, the drive voltage $V_3$ data for the electrostrictive element 3 is incremented by $+1$. When the resultant data is judged as less than the data for the maximum drive voltage $V_3$ max (step 101), the program returns to step 84 in which on the basis of the newly incremented data, this time the drive voltage is applied to the electrostrictive element 3, and adjusts the first head $H_1$ such that its height becomes higher. As a result, when the compared output enters the dead zone, the height adjusting work is ended.

However, when the compared output does not enter the dead zone even after the data was incremented, the data exceeds the data of the maximum drive voltage $V_3$ max so that the program returns to step 81 in which the adjusting work is again executed.

While in the above description the pilot signals $S_{P1}$ and $S_{P2}$ are recorded on the first and fourth tracks $T_1$ and $T_4$ in order that the pilot signal used for adjusting the step difference between the heads is produced at every 6 fields, these pilot signals $S_{P1}$ and $S_{P2}$ may be recorded on tracks that are spaced apart a greater number of tracks than the above.

According to the present invention as set forth above, when the pilot signal $S_{P1}$ is recorded on the first track $T_1$ by the first head $H_1$, this pilot signal $S_{P1}$ is reproduced in the adjacent second track $T_2$, while when the pilot signal $S_{P2}$ is recorded on the fourth track $T_4$ by the second head $H_2$, this pilot signal $S_{P2}$ is reproduced in the adjacent fifth track $T_5$. Accordingly, the pilot signals $S_{P1}$ and $S_{P2}$, which are respectively recorded on the first and fourth tracks $T_1$ and $T_4$, can be reproduced over the whole recording interval $W_R'$.

Therefore, when the track displacement $T_X$ is very small as shown in FIG. 10, a playback interval sufficient for the pilot signal can be secured so that regardless of the length of the track displacement $T_X$, it is possible to generate the drive voltage for driving the electrostrictive element.

Needless to say, this invention can suitably be applied to the prior art recording apparatus having a track displacement $T_X$ of about 1.5 H.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for signal recording in an apparatus having first and second heads for recording and reproducing, and wherein the first and second heads are placed on bimorph leaves, the heads being moved around a rotary drum through an angular distance of substantially 180°, and recording tape being wrapped at least halfway around said drum, comprising the steps of:
   recording a first pilot signal at a predetermined area on a first helical track by said first head;
   reproducing with said second head said recorded first pilot signal on a second helical track next to said first helical track;
   recording a second pilot signal at a predetermied area on a third helical track by said second head;
   reproducing with said first head said recorded second pilot signal on a fourth helical track next to said third track;
   comparing a reproduced level of said first and second pilot signals from said first and second heads; and
   based on said comparison, controlling a drive signal for the bimorph leaves so as to adjust a difference in height between the first and second heads.

2. A method according to claim 1 wherein the reproduced recorded first pilot signal on the second helical track and the reproduced second pilot signal on the fourth helical track are respective cross-talk components of the respective first and second pilot signals.

3. A method according to claim 1 wherein another helical track lies between the second and third helical tracks.

4. A system for signal recording wherein first and second heads for recording and reproducing are provided, the first and second heads being placed on bimorph leaves, the heads being moved around a rotary drum through an angular distance of substantially 180°, and recording tape being wrapped at least halfway around said drum, comprising:
   means for recording a first pilot signal at a predetermined area on a first helical track by said first head;
   means for reproducing with said second head said recorded first pilot signal on a second helical track next to said first helical track;
   means for recording a second pilot signal at a predetermined area on a third helical track by said second head;
   means for reproducing with said first head said recorded second pilot signal on a fourth helical track next to said third track;
   means for comparing a reproduced level of said first and second pilot signals from said first and second heads; and means for controlling a drive signal for the bimorph leaves, based on an output of the comparing means, so as to adjust a difference in height between the first and second heads.

5. A method for adjusting first and second heads for recording and reproducing with respect to a helical scan rotary drum system wherein a recording tape is wrapped partially around a drum and has slant tracks recorded thereon, comprising the steps of:
- recording a first pilot signal during a predetermined interval on a first slant track by said first head;
- reproducing with said second head a cross-talk component of the recorded first pilot signal on a second adjacent slant track;
- recording a second pilot signal during a predetermined interval on a third slant track by said second head;
- reproducing with said first head a cross-talk component of said recorded second pilot signal on the fourth helical slant track adjacent the third slant track;
- comparing a reproduced level of said first and second pilot signal cross-talk components from said first and second heads; and
- based on said comparison, adjusting a position of the first head relative to the second head.

6. A system for adjusting first and second heads for recording and reproducing with respect to a helical scan rotary drum system wherein a recording tape is wrapped partially around a drum and has slant tracks recorded thereon, comprising:
- means for recording a first pilot signal during a predetermined interval on a first slant track by said first head;
- means for reproducing with said second head a cross-talk component of the recorded first pilot signal on a second adjacent track;
- means for recording a second pilot signal during a predetermined interval on a third slant track by said second head;
- means for reproducing with said first head a cross-talk component of said recorded second pilot signal on the fourth slant track adjacent the third slant track;
- means for comparing a reproduced level of said first and second pilot signal cross-talk components from said first and second heads; and
- means for adjusting a position of the first head relative to the second head based on a comparison output of the comparing means.

* * * * *